United States Patent [19]
Kester

[11] 3,922,928
[45] Dec. 2, 1975

[54] STEERING COLUMN FOR A MOTORVEHICLE

[75] Inventor: Wilhelmus Leonardus Maria Kester, Eersel, Netherlands

[73] Assignee: Van Doorne's Personenautofabriek Daf B.V., Eindhoven, Netherlands

[22] Filed: June 7, 1974

[21] Appl. No.: 477,501

[30] Foreign Application Priority Data
July 12, 1973  Netherlands.................... 7309715

[52] U.S. Cl. ............. 74/492; 64/11 R; 64/27 NM; 64/1 V
[51] Int. Cl.²............................................ R62D 1/16
[58] Field of Search ........ 64/8, 11 R, 27 NM, 27 R, 64/1 V, 5, 23, DIG. 2; 74/492, 493

[56] References Cited
UNITED STATES PATENTS

| | | | |
|---|---|---|---|
| 1,572,519 | 2/1926 | Davis............................. | 64/27 NM |
| 3,046,752 | 2/1962 | Deford et al...................... | 64/11 R |
| 3,057,647 | 10/1962 | Wood............................. | 64/11 R |
| 3,066,503 | 12/1962 | Fleming et al.................... | 64/27 NM |
| 3,486,396 | 12/1969 | Yoshioka et al.................... | 74/492 |
| 3,714,841 | 2/1973 | Grosseau ........................ | 74/492 |

Primary Examiner—Benjamin W. Wyche
Assistant Examiner—Randall Heald
Attorney, Agent, or Firm—Wenderoth, Lind & Ponack

[57] ABSTRACT

A steering column for a motor vehicle comprises two coaxial portions, a first portion being positioned partially within a second portion, and a device disposed between the two portions for transmitting steering forces between two portions and for permitting shortening of the steering column. The device includes two tubular members coaxially positioned one behind the other and mounted in rubber or similar material located in the second portion of the steering column. The tubular members have means on their internal surfaces cooperable with means on the first portion of the steering column for permitting relative longitudinal movement between the tubular members and the first portion and for preventing relative rotation between the tubular members and the first portion. Assembly of the steering column includes inserting the first portion into one of the tubular members, rotating the first portion and the one tubular member relative to the other tubular member, and then continuing to insert the first portion into the other tubular member.

3 Claims, 1 Drawing Figure

U.S. Patent Dec. 2, 1975 3,922,928
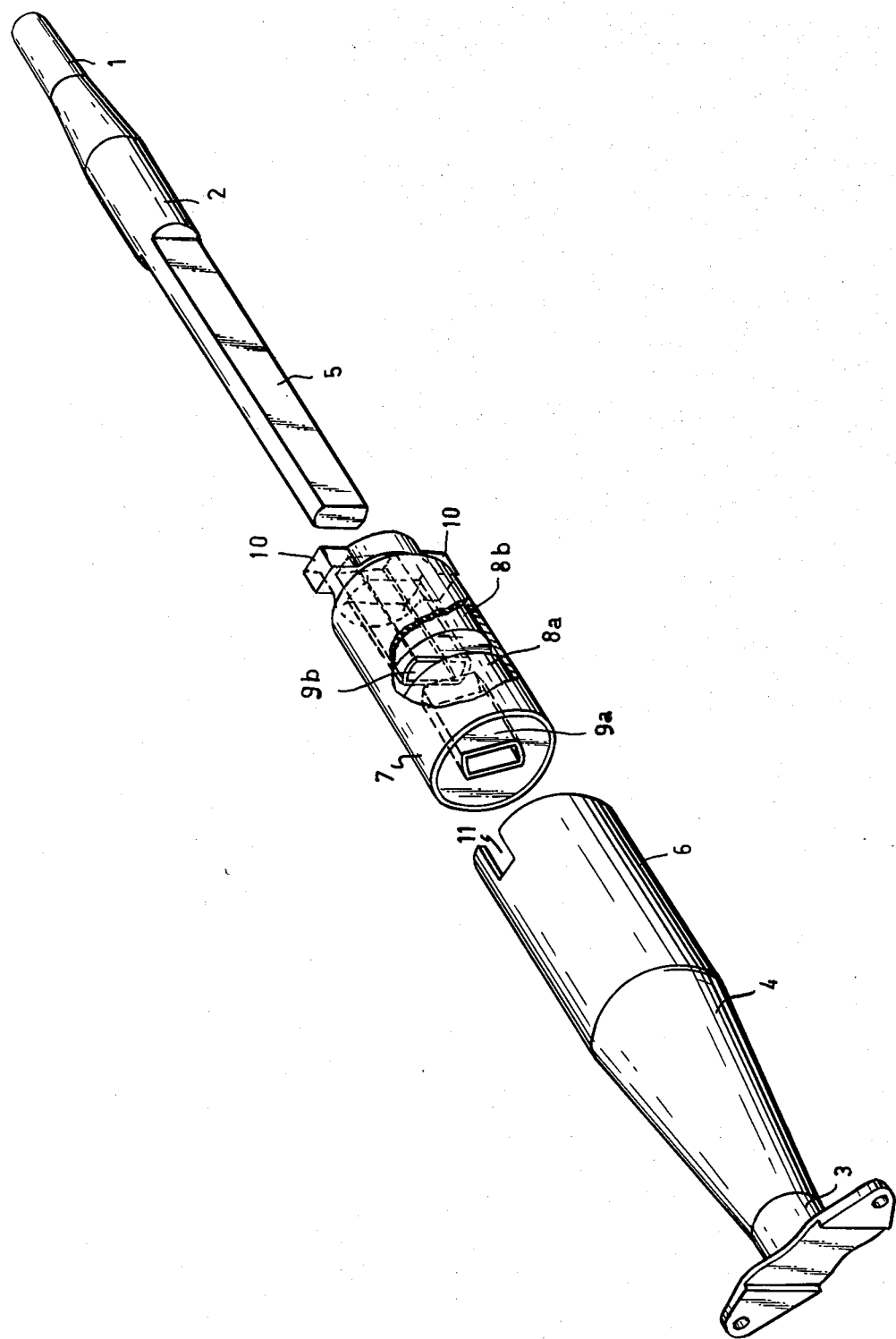

STEERING COLUMN FOR A MOTORVEHICLE

Background of the Invention

This invention relates to a steering column for a motor vehicle. The steering column includes two coaxial steering shaft portions, which portions are positioned one partially within the other. Elements are disposed between the ends of the portions so as to transmit steering forces and to allow possible shortening of the steering column.

In the past, in order to ensure that a steering column structure has no play, two spaced bearings of synthetic material have been provided during the assembly of the steering shaft portions. If the two portions of the steering column are axially displaced with respect to each other, cams arranged thereon and forming the connection between the two portions will be pushed off during a collision, after which both bearings may allow slipping between the two steering shaft portions.

A disadvantage of this known structure is that the cams must be attached in a very special way. The portions of synthetic material are very sensitive to temperature and humidity. The sensitivity to impact load during transport and assembly is great. The parts made of synthetic material are sensitive to steering vibrations.

Summary of the Invention

According to the present invention there is provided a steering column for a motor vehicle, the steering column including two coaxial portions, a first portion being positioned partially within the other, and a device disposed between the two portions for transmitting steering forces between the two portions and for permitting shortening of the steering column. The device includes two tubular members coaxially positioned one behind the other and mounted in rubber or similar material located in a second portion of the steering column. The tubular members have means on their internal surfaces cooperable with means on the first portion of the steering column for permitting relative longitudinal movement between the tubular members and the first portion and for preventing relative rotation between the tubular members and the first portion. Assembly of the steering column includes inserting the first portion into one of the tubular members, rotating the first portion and the one tubular member relative to the other tubular member, and then continuing to insert the first portion into the other tubular member.

Preferably the rubber or similar material is secured within a sleeve located in the second portion of the steering column.

In order to avoid overloading of the rubber or similar material when large steering torques are to be transmitted, it is necessary that these torques be transmitted directly from the one portion of the steering column to the other. To this end the tubular member nearest to the inner shaft portion is provided with one or more peripheral cams, which can cooperate, with lateral play, with recesses in the wall of the external shaft portion of the steering column.

Brief Description of the Drawings

The invention will now described by way of example with reference to the accompanying drawing which is a schematic perspective view of a steering column according to one embodiment of the present invention.

Detailed Description of the Invention

Referring to the drawing, a steering column includes two steering shaft portions 2 and 4. On an end 1 of the steering shaft portion 2 a steering wheel can be mounted in the usual way. A casing for a steering gear may be mounted on the opposite end 3 of the other steering shaft portion 4 in the usual way.

The other end 5 of the steering shaft portion 2 has an angular cross section, i.e. has flat side faces. However, also other forms of the shaft are possible, e.g. the shaft may be splined. A part 6 of the other shaft portion 4 is in the form of a tube into which the end 5 of the portion 2 of the steering shaft can be inserted. In the assembled state of the steering column, a sleeve 7 is mounted between the tubular part 6 and the end 5. A block of rubber or similar material which comprises two parts 8a and 8b lying one behind the other is mounted in the sleeve 7 and is attached thereto e.g. by vulcanisation. Two metallic tubular members 9a and 9b are mounted coaxially and lengthwise, one in each block 8a and 8b, and are attached thereto e.g. by vulcanisation. The tubular members 9a and 9b have an angular cross section corresponding with the external angular cross section of the end portion 5 of the steering shaft portion 2. Thus the steering shaft end portion 5 can be shifted axially in the tubular members 9a and 9b, when the two members 9a and 9b are aligned by torsioning or twisting one of the blocks 8a, 8b relative to the other.

The sleeve 7 with its blocks 8a and 8b, tubular members 9a and 9b, and end portion 5 is located in the tubular portion 6 of the steering shaft portion 4, thus providing a steering column which can be shortened under the influence of an axial force and which is without play because of the rubber blocks 8a and 8b put under torsional tension, and which also is adapted to isolate or absorb vibrations.

So that large torques may be transmitted by the steering column, e.g. when parking, it is desirable that the steering shaft portion 4 be connected directly with the steering shaft portion 2 without the intervention of the parts 7, 8a and 8b, and 9a and 9b. For this purpose the tubular member 9b, that is the one nearer to the steering shaft portion 2, is provided with two peripheral cams 10 on its portion lying beyond the sleeve 7, cams 10 being adapted to cooperate with some play with recesses 11 in the wall of the tubular portion 6.

If the end portion 5 of the steering shaft portion 2 is provided with grooves instead of with flat sides the advantage is obtained that more variation can be put in the tension of the rubber blocks 8a and 8b, e.g. dependent on the hardness of the rubber material forming the blocks.

What is claimed is:

1. A steering column for a motor vehicle, said steering column comprising:
    first and second steering shaft portions, said first shaft portion being partially positioned within said second shaft portion; and
    means, positioned between said first and second shaft portions, for transmitting rotation of one of said shaft portions to the other of said shaft portions and for allowing axial movement of one of said shaft portions with respect to the other of said shaft portions, said means comprising:
    first and second tubular members each fixed to an elastic element fixedly positioned within said second shaft portion, said first and second tubular members being axially positioned one behind the other within said second shaft portion, said first shaft portion extending through said first and second tubular members;

said first and second tubular members each having means on the internal surfaces thereof cooperating with means on the external surface of said first shaft portion for allowing relative axial movement between said first shaft portion and said first and second tubular members and for preventing relative rotation therebetween; and said first and second tubular members being circumferentially positioned such that said means on said internal surfaces therof are circumferentially offset with respect to each other when said first shaft portion is not assembled therein, thereby providing means for exerting torsional pressure on said first shaft portion when said first shaft portion is assembled in said first and second tubular members and for thus retarding axial movement between said first shaft portion and said first and second tubular members.

2. A steering column as claimed in claim 1, further comprising a sleeve positioned within said second shaft portion, said elastic element being fixed to the interior of said sleeve.

3. A steering column as claimed in claim 1, wherein said second shaft has at least one recess therein, and at least one of said tubular members has at least one cam positionable in said recess, there being lateral play between said cam and said recess.

* * * * *